Jan. 9, 1968   M. L. GULLICKSON   3,362,143
AUTOMATIC SHAFT COUPLING
Original Filed April 9, 1965

INVENTOR.
MYRON L. GULLICKSON
BY
Tweedale & Gerhardt
ATTORNEYS

Jan. 9, 1968   M. L. GULLICKSON   3,362,143
AUTOMATIC SHAFT COUPLING
Original Filed April 9, 1965   2 Sheets-Sheet 2
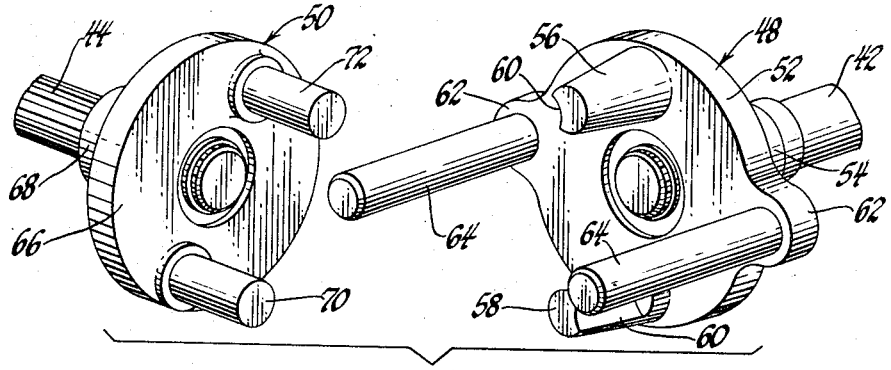
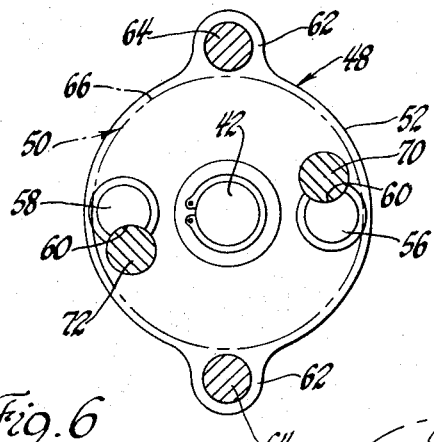
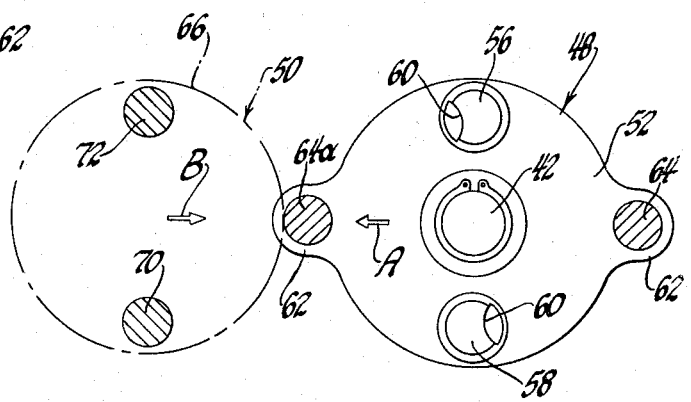
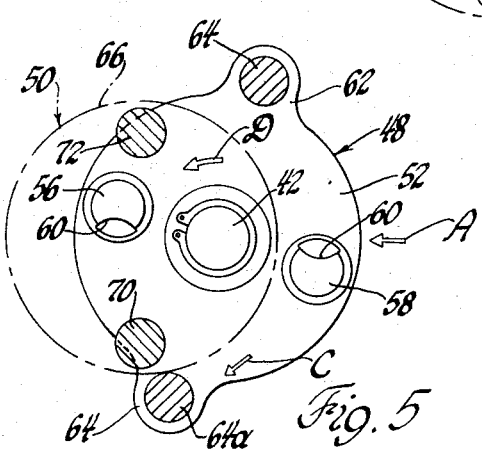
INVENTOR.
MYRON L. GULLICKSON
BY
Tweedale & Gerhardt
ATTORNEYS

United States Patent Office 3,362,143
Patented Jan. 9, 1968

3,362,143
AUTOMATIC SHAFT COUPLING
Myron L. Gullickson, Albion Township, Ontario, Canada, assignor to Massey-Ferguson Industries Limited, Toronto, Ontario, Canada
Continuation of application Ser. No. 446,986, Apr. 9, 1965. This application Nov. 4, 1966, Ser. No. 592,233
14 Claims. (Cl. 56—20)

This application is a continuation of my copending application Ser. No. 446,986, filed Apr. 9, 1965, now abandoned.

This invention relates generally to shaft couplings, and is particularly concerned with shaft couplings for automatically rotatably coupling a pair of shafts together as the shafts are moved into coaxial relationship.

When connecting detachable machinery components together, one having a driven or output shaft and the other having a drive or input shaft, it is usually necessary to couple the shafts together by either actuating a clutch or by manually shifting a coupling sleeve or similar device over the opposed ends of the shafts after they are brought into coaxial relationship. This is particularly necessary when the shafts are moved transversely with respect to each other into their coaxial positions.

An object of this invention is therefore to provide a shaft coupling for rotatably connecting shafts automatically as they are brought into coaxial alignment.

Another object is to provide a shaft coupling that will engage automatically as the shafts move transversely with respect to each other from axially offset positions into coaxial positions.

Still another object is to provide a shaft coupling having a pair of coupling members with axially projecting teeth or lugs drivingly engageable when the coupling members are in coaxial relationship for transmitting rotation from one coupling member to the other, and including deflecting means on one of the coupling members operable to deflect the driving and driven lugs out of interfering paths and guide them into driving relationship as the coupling members are brought into axial alignment from axially offset positions relative to each other.

In achievement of the foregoing, and other objects, a shaft coupling according to the present invention includes an input coupling member and an output coupling member having a pair of axially projecting driving and driven lugs, respectively. When the coupling members are disposed in opposed coaxial relationship, the driven lugs project into the path of rotation of the driving lugs such that each driving lug engages one of the driven lugs to transmit rotation to the output coupling member. In order to prevent the driving and driven pins from interfering with each other as the coupling members are moved transversely with respect to each other from axially offset positions into their coaxial positions, one of the coupling members carries a pair of deflector pins which is engageable with the other coupling member as they approach their coaxial positions and deflects the driving and driven lugs out of interfering paths and guides the driving lugs into driving relationship with the driven lugs as the coupling members assume their coaxial positions.

Other objects, advantages and features of the invention will become apparent from the following description taken in connection with the accompanying drawings in which:

FIG. 3 is a perspective view of the input and output members of the shaft coupling; and FIGS. 4, 5 and 6 sequentially illustrate the manner in which the coupling members engage as they are brought into axial alignment from axially offset positions.

It will be apparent to those skilled in the art that the invention is not limited to the specific form illustrated, and that various other forms may be adopted without departing from the scope and spirit of the invention.

Figure 1:
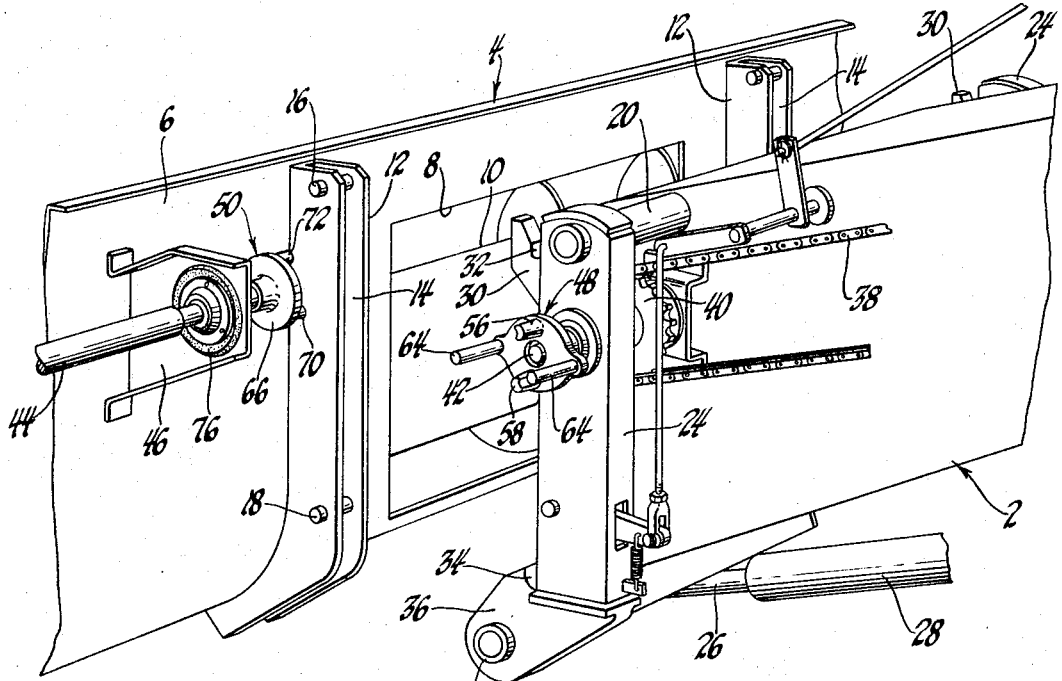
FIG. 1 is a partial perspective view of a pair of detachably connected components of an agricultural combine harvester having a shaft coupling embodying the present invention in its preferred form.

With reference to FIG. 1, reference numeral 2 designates collectively the elevator of a combine harvester for receiving harvested crop material from a harvesting table designated generally by reference numeral 4. The harvesting table 4 is adapted to be detachably connected with elevator 2 and coupled with the elevator drive mechanism for delivering power to the various components of the harvesting table. The rear wall 6 of table 4 is adapted to mate with the forward end of elevator 2, and is formed with an opening 8 which communicates with the elevator when the components 2 and 4 are coupled together. Harvested crop material is delivered through opening 8 into the elevator by means of a conventional auger 10.

Mounted on the rear wall 6 of table 4 is a pair of channel members 12 each defining a vertical groove or slot 14. Upper and lower hook receiving pins 16 and 18 are mounted in each of channel members 12 between the side walls of slot 14. Mounted on tubular beam members 20 and 22 extending laterally from the upper and lower forward end of elevator 2 is a coupling member 24. Power for pivoting elevator 2 upwardly or downwardly relative to the combine main body (not shown) about a horizontal axis is provided by hydraulic pistons 26 reciprocable in cylinders 28 in a conventional manner.

Carried at the upper end of coupling member 24 is a hook 30 having a groove 32 for engagement with the upper pins 16 in channel member 12. Each of the lower pins 18 is engageable with a groove 34 formed in a hook 36 at the lower end of coupling member 24. By manipulating the elevator 2 through pistons and cylinders 26, 28, hooks 30 and 36 may be brought into engagement with pins 16 and 18, respectively, to couple the harvesting table 4 with elevator 2.

Power for the table and elevator is transmitted from the combine engine through a chain 38 mounted at one end on a sprocket 40 secured to the end of an input shaft 42 rotatably journalled in coupling member 24. When pins 16 and 18 are received in hooks 32 and 36, respectively, input shaft 42 is disposed in axial alignment with an output shaft 44 carried by table 4 and rotatably supported near one end on a bearing bracket 46 mounted on the rear wall 6 of the table. The other end of output shaft 44 is connected to drive the auger, cutter and reel of table 4 in a well-known manner.

When input shaft 42 and output shaft 44 are brought into coaxial relationship by the relative movement between elevator 2 and table 4, they are rotatably coupled together by input and output coupling members 48 and 50 mounted respectively on the ends of shafts 42 and 44.

Figure 2:
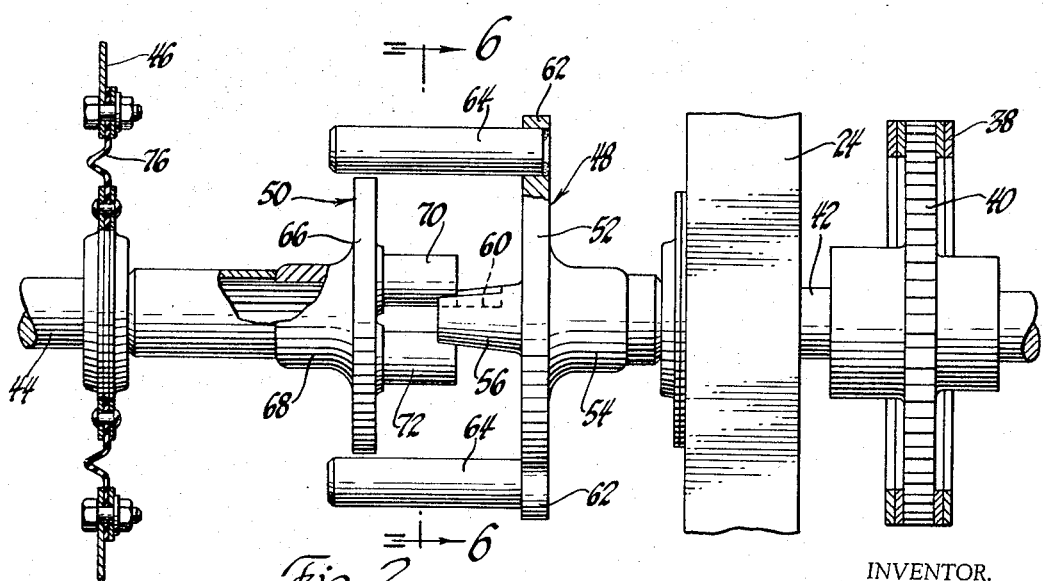
FIG. 2 is an elevational view, partially in section, of the shaft coupling in its engaged position.

With reference to FIGS. 2 and 3, the input coupling member 48 includes a generally circular drum or plate member 52 having an axial hub 54 which receives the end of input shaft 42. Projecting axially from the face of plate member 52 is a pair of driving teeth or lugs 56 and 58 radially spaced on diametrically opposite sides of the axis of shaft 42. Driving lugs 56 and 58 are each formed with oppositely facing arcuate recesses 60 extending over a portion of their axial length.

Projecting radially from the periphery of the input plate member 52 on diametrically opposite sides of the axis of shaft 42 is a pair of ears 62 in which is mounted a pair of axially projecting deflector or guide pins 64. Guide pins 64 are angularly displaced or offset from driving pins 56 and 58 at an angle of 90 degrees. The length of deflector pins 64 is substantially greater than that of driving lugs 56 and 58, and, as shown in FIG. 2, is greater than the axial distance between the coupling members in their opposed, coaxial positions.

The output coupling member 50 includes a circular plate or drum 66 having an axial hub 68 non-rotatably mounted on the end of output shaft 44. Projecting axially from the face of plate 66 is a pair of driven lugs or teeth 70 and 72, preferably of circular cross-section, which are radially spaced on diametrically opposite sides of the axis of shaft 44. The spacing between driven lugs 70 and 72 is the same as that between driving lugs 56 and 58 of the input coupling member 48.

With reference to FIGS. 2 and 6, when shafts 42 and 44 are in their opposed, coaxial positions, the driven lugs 70 and 72 project into the path of rotation of driving lugs 56 and 58 about the common axis of shafts 42 and 44. Consequently, each of the driving lugs 56 and 58 engage one of the driven lugs 70 and 72 to transmit rotation from the input coupling member 48 to the output coupling member 50. As shown in FIG. 6, the driven lugs 70 and 72 are received in the arcuate recesses 60 formed in the driving lugs 56 and 58. The guide or deflector pins 64 project axially on either side of the output coupling member 66 as shown in FIG. 2, that it, output plate member 66 is received between pins 64.

Deflector pins 64 enable the driving lugs 56 and 58 to be brought into driving relationship with the driven lugs 70 and 72 automatically as the input and output coupling members are moved transversely relative to each other from axially offset positions as illustrated in FIG. 4 to their coaxial positions illustrated in FIGS. 2 and 6. With the coupling members oriented as shown in FIG. 4 and moving toward each other in the direction of arrows A and B, driving lugs 56 and 58 will interfere or collide with the driven lugs 72 and 70, respectively, and prevent the coupling members from assuming their coaxial positions as well as prevent the driving lugs from moving into a driving relationship with the driven lugs. Thus, with deflector pins 64 omitted, continuous transverse movement of the coupling members toward each other would cause driving lugs 56 and 58 to strike the driven lugs 72 and 70, respectively, on the same side requiring one of the coupling members and its shaft to be manually rotated to move the driving and driven lugs out of their interfering paths. However, deflector pins 64 are located with respect to the driving lugs 56 and 58 such that when either of the driving lugs is in an interfering path of movement with respect to either of the driving lugs, one of the deflector pins will strike the periphery of the output plate member. On the other hand, when the driving and driven lugs are in non-interfering paths during transverse relative movement of the coupling members, deflecting pins 64 are disposed such that the output coupling plate 66 will pass freely between the deflector pins and move into coaxial relationship with the input coupling member 48 and the driving lugs will each engage one of the driven lugs upon rotation of shaft 42.

FIGS. 4, 5 and 6 sequentially illustrate the operation of the coupling members as they move transversely toward each other from axially offset positions toward coaxial coupled positions. Deflector pin 64a strikes the periphery of output coupling plate 66, and continued movement of input coupling member 48 toward the output coupling member 50 causes pin 64a to slide around the periphery of plate 66 in the direction of arrow C, which in turn causes the input coupling plate 52 to rotate about the axis of shaft 42, as illustrated in FIG. 5 by arrow D. As input plate 52 rotates in the direction of arrow C, while simultaneously moving transversely in the direction of arrow A, the driving lug 56 passes between the driven lugs 70 and 72, permitting the coupling members to assume the coaxial position shown in FIGS. 2 and 6.

In FIG. 6, the coupling members have reached their coaxial positions and counter-clockwise rotation of the input coupling member 48 brings the driving lugs 56 and 58 into driving engagement with lugs 70 and 72, respectively. Lugs 70 and 72 are received in the recesses 60 formed in driving lugs 56 and 58 and continued rotation of the input member 48 is transmitted through lugs 70 and 72 to the output member. Deflector pins 64 are disposed on diametrically opposite sides of the output coupling plate 66 which is axially received between the deflector pin 64.

Under ideal conditions, both driven lugs 70 and 72 are fully seated in the arcuate recesses of drive lugs 56 and 58. However, manufacturing tolerances are sometimes such that only one of the driven lugs is actually in engagement with a driving lug. In order to assure that both driven lugs are fully engaged for transmitting the rotational forces between the coupling members, the output shaft 44 may be rotatably journalled in a flexibly mounted bearing member. As shown in FIGS. 1 and 2, shaft 44 is supported in bearing bracket 46 by a flexible member 76. Consequently, any misalignment due to manufacturing tolerances, is compensated for by deflection of the flexible support member 76.

While a specific form of the invention has been illustrated and described in the foregoing specification and accompanying drawings, it will be apparent to those skilled in the art that the invention is not limited to the exact construction shown, but that various alternatives, equivalents and alterations in the construction and arrangement of parts can be made without departing from the scope and spirit of the invention.

I claim:

1. A shaft coupling comprising: an input coupling member and an output coupling member movable relative to each other between opposed coaxial positions and axially offset positions; a pair of driving lugs projecting axially from said input coupling member radially spaced from the axis of rotation of the input coupling member on diametrically opposite sides thereof; a pair of driven lugs projecting axially from the output coupling member into the path of rotation of the driving lugs when the coupling members are in their opposed, coaxial positions with each of said driven lugs being engageable by one of said driving lugs upon rotation of the input coupling member to cause rotation of said output coupling member; and deflector means carried by one of said coupling members operable as said coupling members approach their opposed coaxial positions from their axially offset positions to deflect the driving and driven lugs out of interfering paths and guide the driving lugs into driving relationship with the driven lugs as the coupling members assume their opposed coaxial positions.

2. A shaft coupling as defined in claim 1 wherein said deflector means comprises axially projecting pins carried by said one coupling member located with respect to the lugs on said one coupling member and having a length such that when said driving and driven lugs are in interfering paths as the coupling members move transversely toward each other from their axially offset positions, one of said pins will strike the other of said coupling members at its periphery, and further transverse movement of the coupling members toward each other will thereby cause said one coupling member to rotate about its axis to move the lugs thereon out of the interfering path with the lugs on the other coupling member as said coupling members assume their opposed, coaxial positions.

3. A shaft coupling as defined in claim 1 wherein said deflector means comprises a pair of deflector pins projecting axially from said one coupling member and radially spaced on diametrically opposite sides of the axis of rotation of said one coupling member, said deflector pins being angularly displaced substantially ninety degrees from the axially projecting lugs on said one coupling member, and said other coupling member being received between said deflector pins when the coupling members are in their opposed, coaxial positions.

4. A shaft coupling as defined in claim 3 further including oppositely facing recesses on said driving lugs extending along a portion of the lengths thereof for receiving the driven lugs when the lugs are in driving relationship.

5. A shaft coupling as defined in claim 4 further including a support bracket, said output coupling member being rotatably supported in said support bracket, and flexible means connected between said support bracket of said output coupling member permitting limited movement of the output coupling member relative to said support bracket as the coupling member is drivingly engaged to compensate for misalignment of the coupling members and assure that both driven lugs will seat in the recesses of their associated driving lugs.

6. A shaft coupling for a pair of components detachably coupled together in which one of said components carries an input shaft and the other of said components carries an output shaft, said input and output shafts moving from axially offset positions with respect to each other into coaxial relationship with their opposed ends spaced from each other as said components are moved from an uncoupled to coupled relationship, said coupling comprising a pair of axially projecting driving lugs on the end of said input shaft spaced radially from the axis of the input shaft on diametrically opposite sides thereof; a pair of driven lugs on the end of said output shaft spaced radially from the axis of the output shaft on diametrically opposite sides thereof; said driven lugs projecting into the path of rotation of said driving lugs and engageable thereby when the shafts are in said coaxial relationship for transmitting rotation of said input shaft to said output shaft; and means carried by one of said shafts operative during movement of said shafts toward each other from their offset to coaxial positions for engaging the other of said shafts when the driving and driven lugs are in interfering paths such that continued movement toward coaxial relationship causes relative rotation between said shafts sufficient to permit the driving lugs to pass between the driven lugs and move into driving relationship therewith as the shafts assume their coaxial positions.

7. In apparatus having a pair of detachably connected components movable relative to each other as they are connected and disconnected; a drive shaft on one of said components and a driven shaft on the other of said components; said drive and driven shafts moving from axially offset positions to opposed, coaxial positions as the components are connected together; an input coupling member on the end of said drive shaft including a circular drum lying in a transverse plane with respect to the drive shaft axis; a pair of spaced driving lugs projecting axially from said input drum in the direction of the driven shaft on diametrically opposite sides of the drive shaft axis; an output coupling member on the end of said driven shaft including a circular drum lying in a transverse plane with respect to the driven shaft axis; a pair of spaced driven lugs projecting axially from said output drum in the direction of the drive shaft axis on diametrically opposite sides of the driven shaft axis; the lengths of the driving lugs and driven lugs being such that when the shafts are in their opposed coaxial positions with the driving and driven lugs in driving relationship, the driven lugs project into the path of rotation of the driving lugs such that each driven lug is engageable by one of the driving lugs to transmit rotation of the drive shaft to the driven shaft; a pair of ears projecting radially in opposite directions from the periphery of one of said drums; a deflector pin mounted in each of said ears and projecting axially therefrom in the direction of the other of said drums; the length of said deflector pins being such that said other drum is received between said deflector pins when the driving and driven lugs are in driving relationship; and said deflector pins being angularly displaced substantially ninety degrees about the axis of said one drum with respect to the lugs thereon.

8. The construction defined in claim 7 further including a bearing bracket on said other component; flexible bearing support means in said bearing bracket; said driven shaft being supported on said flexible means for limited transverse movement to compensate for misalignment between said drive and driven shafts when the components and shafts are coupled together.

9. The construction defined in claim 8 further including oppositely facing recesses in the driving lugs for receiving the driven lugs.

10. A shaft coupling for a pair of components detachably coupled together in which one of said components carries an input shaft and the other of said components carries an output shaft, said input and output shafts being in coaxial relationship with their opposed ends spaced from each other, when the components are coupled together, said shaft coupling comprising a pair of axially projecting driving lugs on the end of said input shaft each spaced radially an equal distance from the axis of the input shaft on diametrically opposite sides of said input shaft axis; a pair of driven lugs on the end of said output shaft each spaced radially an equal distance from the axis of the output shaft on diametrically opposite sides from said output shaft axis; said driven lugs projecting into the path of rotation of said driving lugs about the axis of the input shaft and being engageable thereby when the shafts are in said coaxial relationship for transmitting rotation of said input shaft to said output shaft; said input and output shafts moving from axially offset positions with respect to each other into coaxial relationship as said components move from an uncoupled to coupled relationship; and deflecting means carried by one of said shafts during movement of said shafts from their offset to coaxial relationship for causing relative rotation between said shafts as they approach their coaxial relationship sufficient to move the driving and driven lugs out of interfering path and permit the driving lugs to pass between the driven lugs and move into driving relationship therewith as the shafts assume their coaxial relationship.

11. In an agricultural machine having a vertically movable elevator and a harvesting table supported by the elevator section, said elevator and harvesting table having mating surfaces, the combination comprising coupling means operable upon movement of said mating surfaces into engagement for connecting the elevator with the harvesting table, a driven shaft on the harvesting table, a driving shaft on the elevator, and shaft coupling means on said shafts operable to automatically connect said driving and driven shafts in response to connection of the elevator to the harvesting table upon movement of said mating surfaces into engagement.

12. The combination claimed in claim 11 wherein said driving and driven shafts are mounted on the elevator section and harvesting table, respectively, to extend in a direction transverse to the direction of movement of said mating surfaces into engagement such that said shafts move from offset, parallel relationship into coaxial connection as said mating surfaces move into engagement.

13. The combination claimed in claim 11 wherein said driving and driven shafts extend transversely of the direction of travel and move from parallel, offset relationship into coaxial connection as the mating surfaces move into engagement.

14. The combination claimed in claim 13 wherein said coupling means comprises a pair of axially projecting driving lugs on the end of said driving shaft spaced radially from the axis of the driving shaft on diametrically opposite sides thereof; a pair of driven lugs on the end of said driven shaft spaced radially from the axis of the driven shaft on diametrically opposite sides thereof;

said driven lugs projecting into the path of rotation of said driving lugs and engageable thereby when the shafts are in coaxial relationship for transmitting rotation of said driving shaft to said driven shaft; and means carried by one of said shafts operative during movement of said shafts into coaxial relationship for engaging the other of said shafts when the driving and driven lugs are in interfering paths such that continued movement toward coaxial relationship causes relative rotation between said shafts sufficient to permit the driving lugs to pass between the driven lugs and move into driving relationship therewith as the shafts assume their coaxial positions.

References Cited

UNITED STATES PATENTS 2,816,535   12/1957   Sells _____ 192—67 X

DONLEY J. STOCKING, *Primary Examiner.*

ARTHUR T. McKEON, *Examiner.*